United States Patent
Landers, Jr.

(10) Patent No.: US 8,280,977 B2
(45) Date of Patent: Oct. 2, 2012

(54) AUTOMATIC DATA TRANSFER USING AN INTERMEDIATE DEVICE

(75) Inventor: John David Landers, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 11/535,812

(22) Filed: Sep. 27, 2006

(65) Prior Publication Data

US 2008/0077698 A1    Mar. 27, 2008

(51) Int. Cl.
*G06F 15/16* (2006.01)
(52) U.S. Cl. .......... 709/217; 709/218; 709/219
(58) Field of Classification Search .......... 709/217
See application file for complete search history.

(56) References Cited

U.S. PATENT DOCUMENTS

| | | | |
|---|---|---|---|
| 6,314,425 B1 * | 11/2001 | Serbinis et al. | 707/10 |
| 6,496,979 B1 * | 12/2002 | Chen et al. | 717/178 |
| 6,907,457 B2 * | 6/2005 | Merrell et al. | 709/223 |
| 2003/0224760 A1 | 12/2003 | Day | |
| 2005/0216670 A1 * | 9/2005 | Atkinson et al. | 711/118 |
| 2005/0250533 A1 | 11/2005 | El-Batal et al. | |
| 2006/0026302 A1 * | 2/2006 | Bennett et al. | 709/246 |
| 2006/0153198 A1 * | 7/2006 | Chadha | 370/395.2 |

FOREIGN PATENT DOCUMENTS

WO    02069116 A2    9/2002

* cited by examiner

*Primary Examiner* — Kenny Lin
*Assistant Examiner* — Shripal Khajuria
(74) *Attorney, Agent, or Firm* — Yee & Associates, P.C.; Tom Tyson (57) ABSTRACT

A computer implemented method, data processing system, and computer usable program code are provided for data transfer using an intermediate device. The intermediate device receives data from a source device. The intermediate device may also receive access parameters associated with the data from the source device indicating which devices can read the data from the source being stored in the intermediate device. The intermediate device stores the data and any access parameters associated with the stored data. Next, the intermediate device detects a second device using a wired or wireless network. The second device presents to the intermediate device access parameters associated with the second device. The intermediate device determines whether the second device can use the stored data by matching the access parameters associated with the second device with the access parameters associated with the stored data. If a match is found, or the stored data is open for any device to read, and the second device is able to use the stored data, the intermediate device sends the stored data to the second device.

20 Claims, 4 Drawing Sheets

AUTOMATIC DATA TRANSFER USING AN INTERMEDIATE DEVICE

BACKGROUND OF THE INVENTION

1. Field of the Invention

The illustrative embodiment relates generally to an improved data processing system, and in particular, to a computer implemented method, apparatus, and computer usable program code for automatic transfer of data. In particular, the illustrative embodiment is directed to a computer implemented method, apparatus, and computer usable program code for automatically transferring data from one data processing system to another using an intermediate data storage device.

2. Description of the Related Art

Data processing systems need to exchange data with other data processing systems in order to be useful. For example, data may be transferred to facilitate the use of data or to improve the use of data. People transfer data from a desktop computer to a mobile personal digital assistant (PDA), from a laptop computer to a phone, and from an email server to an email software application on a computer, a mobile phone, or a PDA. For example, people may transfer documents or spreadsheets in order to work on them in different places. People may also transfer other data, such as email, pictures, or video for use in different places.

Generally, a user of the data determines what data must be exchanged, which data processing system is the source of the data, and which data processing system is the destination. In performing such data exchanges, the data has to be carefully identified, and carefully formatted at the source data processing system to be acceptable to the destination data processing system. Further, the source and the destination are associated with each other through a well-known pre-established communication protocol over which the data exchange takes place.

Such data exchanges can take place nearly simultaneously, with the source data processing system providing the data and the destination data processing system receiving the data in a near real time fashion. Examples of such a data exchange are—transferring files using file transfer protocol (FTP), and downloading information from a website, such as a banking website. The data exchanges can also be performed a synchronously, where the source provides the data, and the data is stored for later retrieval by the receiver. An example of such a data exchange is an email system where a sender sends the email to a recipient and an email server holds the email in a recipient's mailbox account for later retrieval. In either case, the data being exchanged is required to form a particular format. Compliance with this format is required on the part of any source of such data, any system that holds the data being exchanged between the source and the receiver, and the receiver.

Data exchanges also take place with the use of portable storage devices such as floppy disks, CD-ROMS, and USB Flash-drives. These types of media are generally format agnostic. In other words, any type of data may be stored and exchanged using these types of media. These types of media, however, are incapable of distinguishing between the various sources and receivers of the data stored on these media. Any source equipped with writing technology that is compatible with these media may write data to such media, and any receiver with compatible reading technology may read from such media. Furthermore, such media require some user intervention in order to complete the data exchange. The CD-ROM, floppy disks, and USB flash-drives all require a user to place the medium in a drive or a port and execute the write through performance of a sequence of steps on the source data processing system. Likewise, the user must place the medium in a drive or a port at the receiver data processing system and execute a sequence of steps on the receiver data processing system to read the data.

BRIEF SUMMARY OF THE INVENTION

The illustrative embodiments provide a computer implemented method, apparatus, and computer usable program code for data transfer using an intermediate device. The intermediate device receives data from a source device. Responsive to receiving the data, the intermediate device stores the data to form stored data. Next, the intermediate device detects a second device. Responsive to detecting the second device, the intermediate device determines whether the second device can use the stored data. The intermediate device sends the stored data to the second device in responses to the second device being able to use the stored data.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
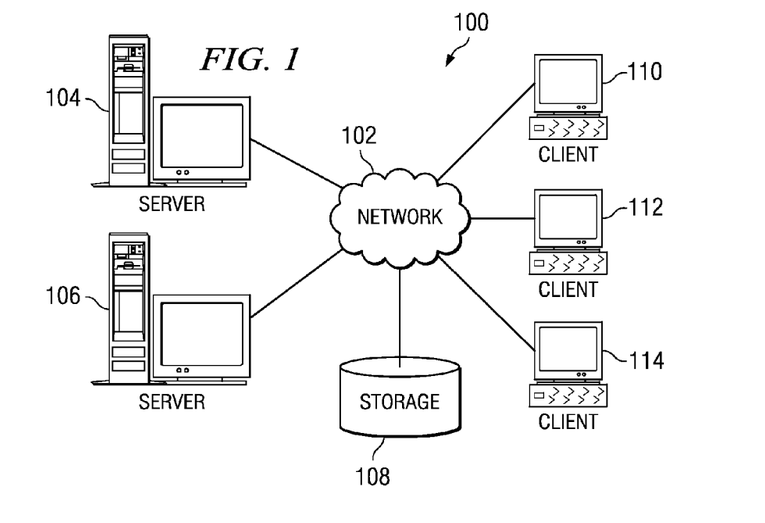
FIG. 1 depicts a pictorial representation of a network of data processing systems in which illustrative embodiments may be implemented.
Figure 2:
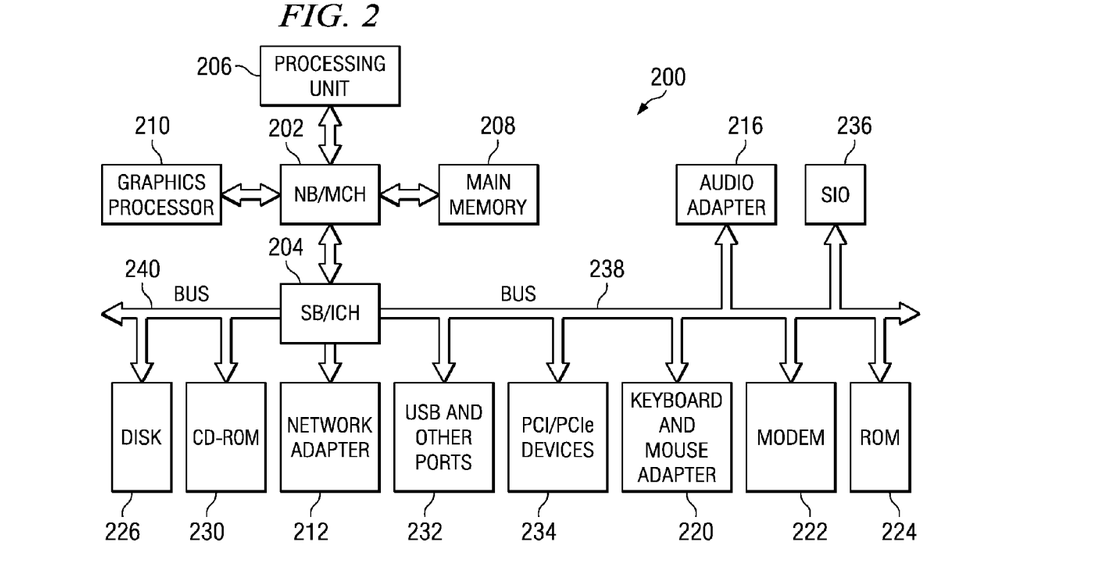
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 may also be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments recognize that passive media have a number of shortcomings. For example, the illustrative embodiments recognize that the ability to transfer data from a source data processing system to a receiver data processing system is subject to the limitations posed by the medium used for the data transfer.

The illustrative embodiments also recognize that most passive media, such as floppy disks, CD-ROM, and USB flash-drives, require the user to take some action to write/read data to/from the media. A passive medium is a storage medium that can store any data without having any ability to perform any selection of source or receiver data processing systems. A passive medium is also unable to perform any manipulation of the data stored in the medium. A passive medium simply stores the data for exchange. Furthermore, the source and receiver data processing systems have to be compatible with the passive medium to perform the data exchange.

The illustrative embodiments also recognize that presently available passive media are incapable of identification or selection of source or receiver data processing systems without further use of data processing systems in addition to the passive media. Similarly, the illustrative embodiments also recognize that the presently available passive media also cannot manipulate the data stored in these media without further help of external data processing systems.

When the data is exchanged through an active medium, such as a hard disk in a server, an intermediate data processing system is used in addition to the source and receiver data processing systems. An email system is an example of a system using a data transfer, involving a source data processing system, an intermediate email server with storage, and a receiver data processing system. An active medium is a medium capable of identifying or selecting data processing systems based upon the medium's own capabilities or the capabilities of a connected data processing system that hosts the active medium. Active medium can also have the ability to perform manipulation of the data stored in the medium.

The illustrative embodiments recognize the following shortcomings in the active medium method of data transfer. Even with active media, the ability to identify or select data processing systems, as well as the ability to manipulate the data stored on those media, is imparted by external data processing systems. On their own, the media, whether active or passive, presently can only store the data provided by the source, and allow the receiver the access to that data. A data processing system other than the source or the receiver data processing system is required to impart system identification, selection, and data manipulation functionalities to the presently available storage media.

In view of the shortcomings of active and passive media identified above, the illustrative embodiments recognized that a mechanism for data transfer using an intermediate data storage device would be advantageous. Such a mechanism would be capable of performing data transfers automatically without user intervention. The different embodiments include capabilities for identifying and selecting data processing systems, and capabilities to manipulate the data stored within the intermediate data storage device.

Figure 3:
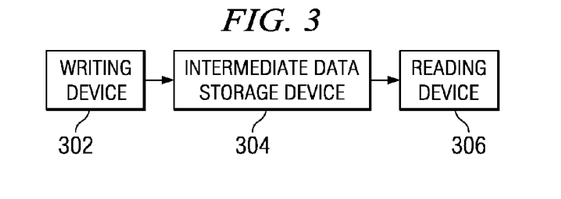
FIG. 3 is a block diagram of a data transfer using an intermediate data storage device in accordance with an illustrative embodiment.

With reference now to FIG. 3, a block diagram of a data transfer using an intermediate data storage device is depicted in accordance with an illustrative embodiment. Writing device 302 writes data to intermediate data storage device 304. Reading device 306 reads data from intermediate data storage device 304.

Data sharing devices are devices capable of sharing data with each other by using some mechanism for data transfer. A data sharing device that writes the data to be shared to the data transfer mechanism is a writing device. Similarly, a data sharing device that reads the shared data from the data transfer mechanism is a reading device. A data sharing device, such as writing device 302, and reading device 306, may be implemented using a server, such as server 104 in FIG. 1, or a client, such as client 110 in FIG. 1.

Writing device 302, a data sharing device, is the source of the data to be transferred. Writing device 302 writes the data to an intermediate data storage device 304. Such writing of the data may be through automatic or manual transfer from the writing device to the intermediate data storage device. An automatic transfer is a data transfer when a writing device, such as writing device 302, determines which data to transfer and when the transfer should take place. A manual transfer, on the other hand, is a data transfer when a user, and not a data sharing device, decides which data to transfer and when the transfer should occur.

Intermediate data storage device 304 includes the mechanism necessary for storing data, and software necessary for the storage and sharing of such data as described in the detailed description of FIG. 4 below. Intermediate data storage device 304 is usable for storage and transfer of any type of data. Intermediate data storage device 304 is also usable with any type of data sharing devices so long as such devices are capable of communicating with the intermediate data storage device over some type of data network.

Next, in these illustrative examples, intermediate data storage device 304 is situated such that intermediate data storage device 304 can communicate with reading device 306. An intermediate data storage device, such as intermediate data storage device 304, may communicate with a data sharing device, such as writing device 302 or reading device 306, simply by being in the proximity of the data sharing device and using a wireless network. The intermediate data storage device may also communicate with a data sharing device by physically connecting to the data sharing device to utilize a wired data network. These examples of situating an intermediate data storage device such that communication with a data sharing device is enabled are not intended to be limiting on the illustrative embodiment. Other ways of establishing communication between an intermediate data storage device and a data sharing device will become apparent to persons of ordinary skill in the art from this disclosure.

Continuing with the description of FIG. 3, reading device 306 is a data sharing device as described above. Reading device 306 reads any data from intermediate data storage device 304 that has been identified by a writing device, such as writing device 302, as readable by reading device 306.

Figure 4:
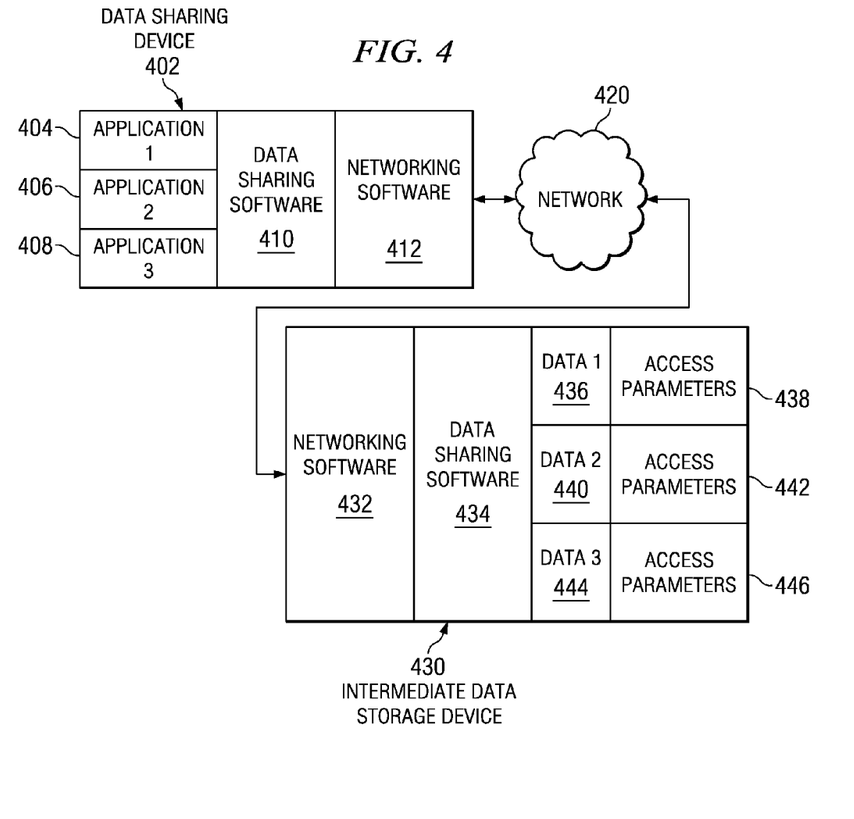
FIG. 4 is a component diagram of a data sharing device and an intermediate data storage device in accordance with an illustrative embodiment.

With reference now to FIG. 4, a component diagram of a data sharing device and an intermediate data storage device is depicted in accordance with an illustrative embodiment.

Data sharing device 402 is similar to writing device 302 or reading device 306 in FIG. 3. Data sharing device 402 depicted in FIG. 4 includes several software applications, such as application-1 404, application-2 406, and application-3 408. Each of these applications 404-408 interacts with data sharing software 410, also included in data sharing device 402. Applications 404-408 use data sharing software 410 to read from, or write to, intermediate data storage devices such as intermediate device 304 of FIG. 3. Data sharing software 410 on data sharing device 402 uses networking software 412 on data sharing device 402 to identify and connect to data communication networks, such as network 420.

Network 420 can be one or more wired or wireless networks. Furthermore, the identified networks may be secured or unsecured. A secured network provides one or more mechanisms for preventing unintended and undesirable interference with the data traveling over that network. An unsecured network does not employ such preventative mechanisms. Data sharing software 410 in conjunction with networking software 412 selects a network from the identified secured/unsecured networks 420 to connect to intermediate data storage device 430.

Intermediate data storage device 430 contains networking software 432, which may or may not be similar to networking software 412 on data sharing device 402. Networking software 432 enables intermediate data storage device 430 to connect to network 420, which may be secured or unsecured. Data sharing software 434 uses networking software 432 to connect with data sharing device 402 via a selected network connection.

Data sharing software on the intermediate data storage device is also capable of performing manipulations on the data that is to be stored on or read from the intermediate data storage device. Manipulations on data can be performed by way of pre-transfer or post-transfer actions. Pre-transfer actions are manipulations performed on the data after the data is received from a data sharing device but before the data is stored in the intermediate data storage device. Encryption of data is an example of pre-transfer manipulation. Post-transfer actions are manipulations performed on the data after the data has been stored in the intermediate data storage device. Some examples of such manipulations include decrypting the data and expiring old data so it cannot be read after a set time has expired or after certain events have occurred. These manipulations are only listed as exemplary and are not intended to be limiting on the illustrative embodiment. Other manipulations are going to become apparent from this disclosure to persons skilled in the pertinent art.

Intermediate data storage device 430 stores the data that the data sharing devices, such as data sharing device 402, write. Data sharing devices that write data to the intermediate data storage device can also specify access parameters for the readers of that data. Access parameters define which specific device or category of devices may read the stored data. Access parameters also include additional criteria for accessing the stored data, such as any time limits within which the data must be accessed, whether a read confirmation is required, and whether single or multiple read of the data is allowed. Access parameters may also place restrictions on the automatic read and write of the associated data. For example, an access parameter may specify that the associated data may not be automatically read without user intervention.

These examples of access parameters are not intended to be limiting on the illustrative embodiment described here. Additional access parameters for controlling or limiting the access to the stored data will become apparent to persons skilled in the pertinent art.

Furthermore, the data and access parameters associated with the data need not be separate from one another. For example, header information of a data block may contain sufficient information indicating limitations on the access to the remainder of the data block to form access parameters as described here, eliminating the need for separate access parameters. The data and the access parameters are described separately here only to identify the characteristics and interactions involving each of them.

Data-1 436 is one such data written by a data sharing device, such as data sharing device 402, stored together with accompanying access parameters 438 that govern who can read data-1 436 and under what circumstances. Data-2 440 and accompanying access parameters 442, and data-3 444 and accompanying access parameters 446 are more examples of data and access parameters stored in intermediate data storage device 430. Depiction of three software applications 404-408 on data sharing device 402, and three sets of data and access parameters 436-446 on intermediate data storage device 430 are not intended to be limited on either devices 402 or 430. Any number of applications with data creating and data sharing capabilities are conceivable on data sharing devices such as 402. Similarly, any amount of data organized in any number of pieces of data with access parameters is also conceivable, limited only by the storage capacity of a particular intermediate data storage device, such as 430.

Figure 5:
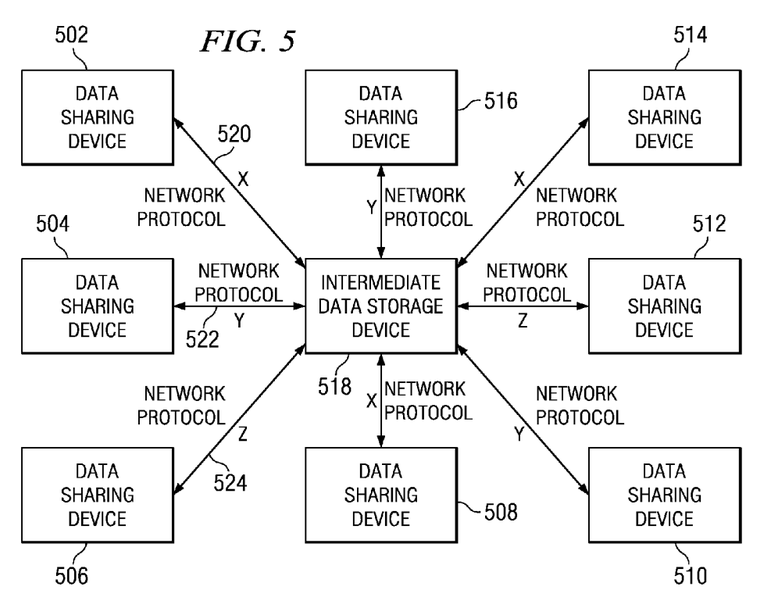
FIG. 5 is a block diagram of several data sharing devices interacting with an intermediate data storage device in accordance with an illustrative embodiment.

With reference now to FIG. 5, a block diagram of data sharing devices interacting with intermediate data storage device is depicted in accordance with an illustrative embodiment. Data sharing devices 502-516 may be implemented using data sharing device 402 in FIG. 4, and can function as writing device 302 or reading device 306 in FIG. 3. A data sharing device is capable of both reading and writing with respect to an intermediate data storage device depending on the data sharing needs at any given time. Data sharing devices that perform only reading functions or writing functions are also conceivable. For example, a navigation system in an automobile may be able to read data from an intermediate data storage device but not write data. Similarly, a device listening for signals may only be able to write the received signals to an intermediate data storage device but not read from the intermediate data storage device in a meaningful way.

Data sharing devices 502-516 are shown as being in communication with intermediate data storage device 518. Data sharing devices 502-516 may be implemented using data sharing device 402 in FIG. 4, and intermediate data storage device 518 may be implemented using intermediate data storage device 430 in FIG. 4. The various communications links between data sharing devices 502-516 and intermediate data storage device 518 may be made using variety of network protocols 520-524. For example, depicted network protocol X 520 may be TCP/IP over Ethernet, network protocol Y 522 may be wireless Bluetooth, and network protocol Z 524 may be wired USB.

The block diagram in FIG. 5 depicts that one or more data sharing devices may connect with one or more intermediate data storage devices using one or more network protocols. Such connections may be simultaneous, in some pre-determined order, or in random sequence. The depiction of FIG. 5 is not intended to be a limitation on the number of data sharing devices simultaneously in communication with intermediate data storage device 518. The number of communications links is only limited by the limitations of the network protocols used for the connections. Furthermore, FIG. 5 also illustrates that one or more data sharing devices can write to an intermediate data storage device simultaneously, as one or more data sharing devices are reading from the intermediate data storage device. For clarity, FIG. 5 shows only one intermediate data storage device in communication with several data sharing devices. However, several intermediate data storage devices can simultaneously connect to several data sharing devices over several network connections for simultaneous reading and writing of data in a given environment.

Figure 6:
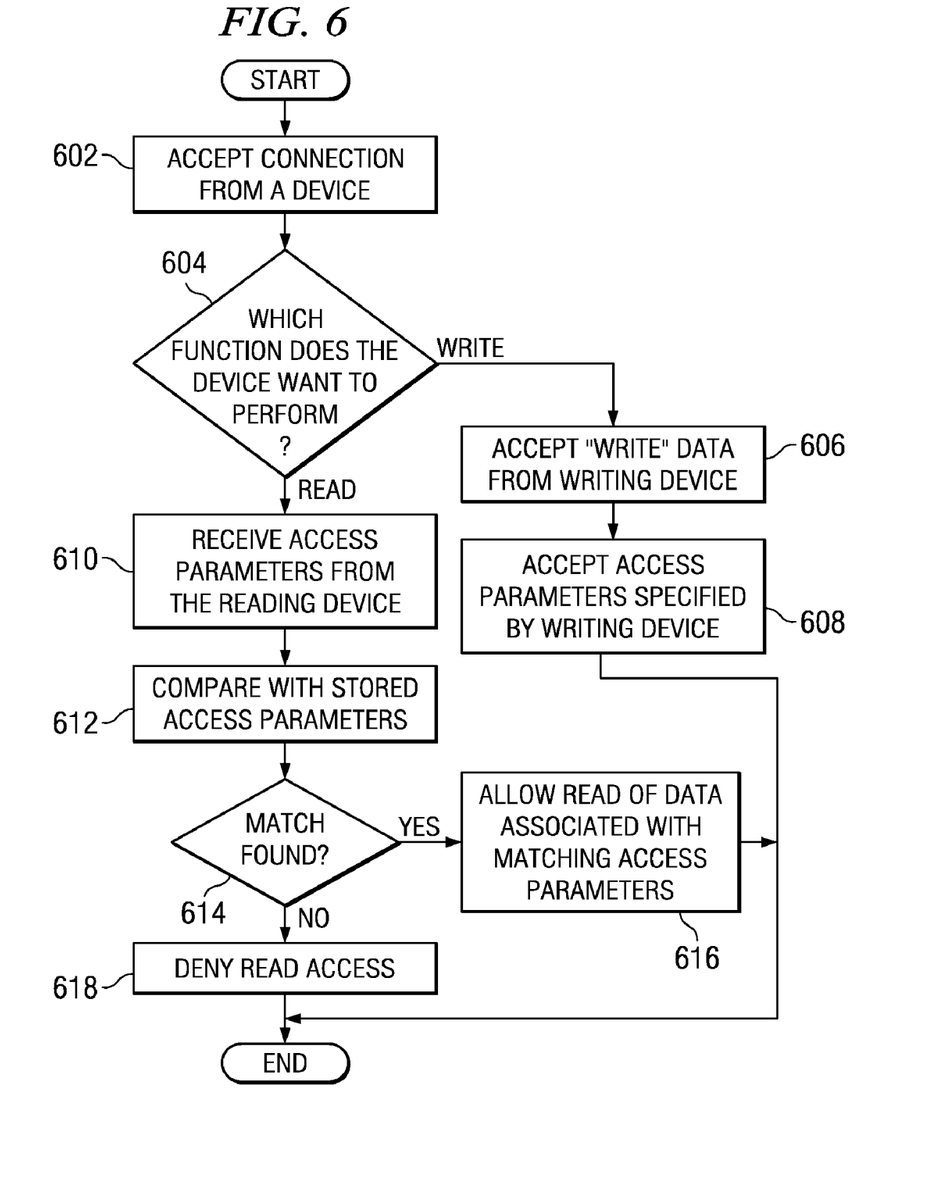
FIG. 6 is a flowchart of a data transfer using the intermediate data sharing device in accordance with an illustrative embodiment.

With reference now to FIG. 6, a flowchart of a data transfer using the intermediate data sharing device is depicted in accordance with an illustrative embodiment. The process illustrated in FIG. 6 applies to the configuration where a data sharing device, which may be implemented using data sharing device 402 in FIG. 4, initiates a connection with an intermediate data storage device, which may be implemented as intermediate data storage device 430 in FIG. 4. The flowchart in FIG. 6 depicts the steps of a data transfer involving one data sharing device that writes to, and one data sharing device that reads from, one intermediate data sharing device. The data transfer depicted in FIG. 6, however, is similarly applicable to more than one instance of the types of devices depicted. The steps of data transfer depicted in FIG. 6 can be applied to multiple devices writing to, and multiple devices reading from, each of several intermediate data storage devices. The process is implemented in the intermediate data storage device, such as intermediate data storage device 430 in FIG. 4.

The process begins with an intermediate data storage device, such as 430 in FIG. 4, accepting a connection from a data sharing device, such as 402 in FIG. 4 (step 602). Because the wired or wireless networks used for establishing the connection between the devices may be secured or unsecured, the connection process may include additional steps for authenticating each connecting device and authorizing access to each device. Authentication and authorization steps may be included in the process described here as needed for a particular network configuration without affecting the scope and spirit of the described illustrative embodiment.

Next, the process determines the nature of the function the connected data sharing device wants to perform (step 604). A data sharing device may perform a "write" function or a "read" function with respect to an intermediate data storage device. A "write" function is the process by which a data sharing device stores data into an intermediate data storage device. The data sharing device performing the "write" function is a writing device. A "read" function is the process by which a data sharing device retrieves data from an intermediate data storage device. The data sharing device performing the "read" function is a reading device.

If the process determines that the connected data sharing device wants to perform a "write" function (write path of step 604), the connected data sharing device is deemed to be a writing device, and the process accepts the data from the writing device (step 606). The process also accepts any access parameters related to the data being written, as specified by the writing device (step 608). The process terminates thereafter.

If the process determines that the connected data sharing device wants to perform a "read" function (read path of step 604), the connected data sharing device is deemed to be a reading device, and the process receives access parameters from the reading device (step 610). The process compares the reading device's access parameters with the several access parameters stored with the several pieces of data in the intermediate data storage device (step 612). Access parameters of a data sharing device are parameters that identify the data sharing device or the category of devices to which the data sharing device belongs. Additional access parameters for data sharing devices may be defined as needed, and will become apparent to persons skilled in the pertinent art.

The process determines if the reading device's access parameters match with any of the access parameters stored in the intermediate data storage device (step 614). If a match is found (yes path of step 614), the process allows the reading device access to the data whose access parameters match with the reading device's access parameters (step 616). The process terminates thereafter. If, however, a match is not found (no path of step 614), the intermediate data storage device denies the reading device access to the data stored in the intermediate data sharing device (step 618). The process terminates thereafter. Note that the process described in FIG. 6 proceeds without user intervention unless access parameters of the data in question require user intervention.

Figure 7:
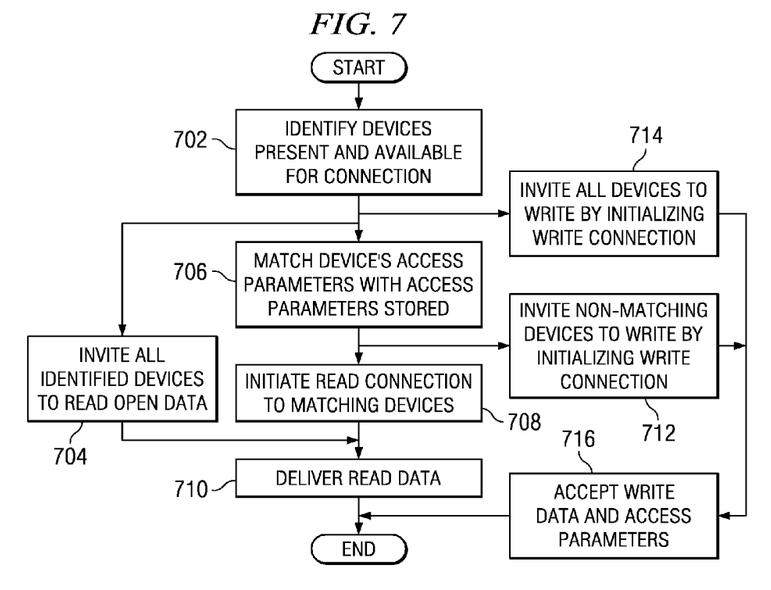
FIG. 7 is a flowchart of a data transfer using the intermediate data sharing device in accordance with an illustrative embodiment.

With reference now to FIG. 7, a flowchart of a data transfer using the intermediate data sharing device is depicted in accordance with an illustrative embodiment. The process illustrated in FIG. 7 applies to the configuration where an intermediate data storage device, such as intermediate data storage device 430 in FIG. 4, initiates a connection with a data sharing device, such as data sharing device 402 in FIG. 4. The flowchart of FIG. 7 depicts the steps of a data transfer involving one or more data sharing devices that write to, and one or more data sharing devices that read from, one intermediate data sharing device. The data transfer process depicted in FIG. 7 is replicated for each intermediate data storage device when more than one intermediate data storage devices are present. The process is implemented in the intermediate data storage device, such as intermediate data storage device 430 in FIG. 4.

The data transfer process of FIG. 7 begins with the intermediate data storage device searching for and identifying the various data sharing devices present and available for connection in a given time and place (step 702). The process identifies the access parameters of the various data sharing devices found in step 702.

Data stored in an intermediate data storage device need not necessarily have associated access parameters. Without any access parameters, the data is considered open for reading by any reading device. Consequently, all identified devices can be granted read access to such data. The process invites all identified devices from step 702 to read open data stored in the intermediate data storage device (step 704).

Next, the process matches the access parameters of the found data sharing devices with the access parameters associated with the several pieces of data stored in the intermediate data storage device (step 706). The process initiates a read connection with the data sharing devices whose access parameters match with access parameters associated with one or more of the several pieces of data stored in the intermediate data storage device (step 708). A "read" connection is a connection between devices through which a data sharing device can perform a read function. A reading device reads from an intermediate data sharing device using a read connection. Having established a read connection with one or more reading devices, the process delivers that data to that reading device where the respective associated access parameters match (step 710). The process terminates thereafter.

If the process finds data sharing devices whose access parameters do not match with any access parameters associated with the pieces of data stored in the intermediate data storage device in step 706, the process invites such data sharing devices to write by initiating a write connection (step 712). A "write" connection is a connection between devices through which a data sharing device can perform a write function. A writing device writes to an intermediate data sharing device using a write connection.

Alternatively, the process may invite all found devices to write data, regardless of any matching of access parameters (step 714). In this manner, even the reading devices are able to write to the intermediate data storage device.

Having established a write connection with one or more writing devices in either step 712 or step 714, the process accepts data and associated access parameters for storage (step 716). The process terminates thereafter.

Thus, the illustrative embodiments provide a computer implemented method, apparatus, and computer usable program code by which data transfer can occur automatically and without user intervention between distinct disconnected data sharing devices, using intermediate data storage devices. The data sharing devices do not have to be compatible with each other in order to accomplish the data transfer. Any data sharing device may write any type of data, and may specify parameters under which access to that data is to be granted. Similarly, any data sharing device may request reading access to data stored in the intermediate data storage device, and may get access to such data if access parameters match.

Furthermore, the intermediate data storage devices can communicate over a variety of networks, removing the need for compatible read/write mechanisms, such as CD-ROM drives, in the data sharing devices. The data sharing devices are automatically identified and selected for performing appropriate data transfers. The illustrative embodiments provide mechanisms for manipulating data on the intermediate data storage devices without the need for extrinsic data processing systems.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the illustrated embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for data transfer using a mobile device, the computer implemented method comprising:
   identifying, by the mobile device, a number of data sharing devices available for connection to the mobile device, wherein each data sharing device that stores particular data on the mobile device specifies particular access parameters for readers of the particular data;
   identifying access parameters associated with each of the number of data sharing devices, wherein the mobile device is an intermediate data storage device and wherein access is controlled by the mobile device to the particular data stored on the mobile device using the particular access parameters, wherein the particular access parameters define which specific data sharing device or category of data sharing devices may read the particular data stored on the mobile device;
   determining, by the mobile device, whether devices in the number of data sharing devices are attempting to one of send data to the mobile device and receive data from the mobile device;
   responsive to determining that a source device of the number of data sharing devices is attempting to send data to the mobile device, receiving, by the mobile device, data from the source device and access parameters associated with the data from the source device, wherein the access parameters associated with the data identify a device that can use the data from the source device, wherein the data from the source device is received by the mobile device without user intervention;
   responsive to receiving the data and the access parameters, storing the data on the mobile device to form stored data and storing the access parameters associated with the data on the mobile device in association with the stored data to form stored access parameters;
   responsive to determining that a second device of the number of data sharing devices is attempting to receive the stored data, determining, by the mobile device, whether the second device can use the stored data based on the stored access parameters and the access parameters associated with the second device; and
   responsive to determining, by the mobile device, that the second device can use the stored data, sending, by the mobile device, the stored data to the second device, wherein sending of the stored data to the second device occurs without user intervention unless the stored access parameters require user intervention; wherein the stored access parameters include criteria for accessing the stored data, time limits within which the stored data must be accessed, requirements for a read confirmation, requirements for only a single read of the stored data, and restrictions on an automatic read and write of the stored data, and a requirement that one or more stored data may not be automatically read without a user intervention.

2. The method of claim 1, wherein determining whether the second device can use the stored data comprises:
   receiving access parameters associated with the second device forming device access parameters; and
   matching the stored access parameters with the device access parameters.

3. The method of claim 1, wherein the number of data sharing devices include data sharing devices that send data to the intermediate data storage device and data sharing devices that receive data from the intermediate data storage.

4. The method of claim 1, wherein the intermediate data storage device is capable of connecting with a plurality of source devices and a plurality of second devices using at least one of wired and wireless networks, wherein the intermediate data storage device detects available devices including at least one of the plurality of source devices and the plurality of second devices, and wherein the intermediate data storage device begins receiving the data from the source device, and sending the stored data to the second device.

5. The method of claim 4, wherein the available devices detect the intermediate data storage device, and wherein the available devices begin at least one of sending the data from the source device and receiving the stored data from the intermediate data storage device.

6. The method of claim 1, wherein the intermediate data storage device performs pre-transfer actions with respect to the data from the source device, and post-transfer actions with respect to the stored data.

7. The method of claim 1, wherein the intermediate data storage device is agnostic to data format of the data from the source device.

8. A data processing system for data transfer using a mobile device, the data processing system comprising:
a mobile device configured to:
identify a number of data sharing devices available for connection to the mobile device, wherein each data sharing device that stores particular data on the mobile device specifies particular access parameters for readers of the particular data;
identify access parameters associated with each of the number of data sharing devices, wherein the mobile device is an intermediate data storage device and wherein access to the particular data stored on the mobile device is controlled by the mobile device using the particular access parameters, wherein the particular access parameters define which specific data sharing device or category of data sharing devices may read the particular data stored on the mobile device;
determine whether devices in the number of data sharing devices are attempting to one of send data to the mobile device and receive data from the mobile device;
responsive to determining that a source device of the number of data sharing devices is attempting to send data to the mobile device, receive data from the source device and access parameters associated with the data from the source device, wherein the access parameters associated with the data identify a device that can use the data from the source device, wherein the data from the source device is received by the mobile device without user intervention;
responsive to receiving the data and the access parameters, store the data on the mobile device to form stored data and storing the access parameters associated with the data on the mobile device in association with the stored data to form stored access parameters;
responsive to determining that a second device of the number of data sharing devices is attempting to receive the stored data, determine whether the second device can use the stored data based on the stored access parameters and the access parameters associated with the second device; and
responsive to determining, by the mobile device, that the second device can use the stored data, send the stored data to the second device, wherein sending of the stored data to the second device occurs without user intervention unless the stored access parameters require user intervention; wherein the stored access parameters include criteria for accessing the stored data, time limits within which the stored data must be accessed, requirements for a read confirmation, requirements for only a single read of the stored data, and restrictions on an automatic read and write of the stored data, and a requirement that one or more stored data may not be automatically read without a user intervention.

9. The data processing system of claim 8, wherein determining whether the second device can use the stored data comprises receiving access parameters associated with the second device forming device access parameters, and matching the stored access parameters with the device access parameters.

10. The data processing system of claim 8, wherein the number of data sharing devices include data sharing devices that send data to the intermediate data storage device and data sharing devices that receive data from the intermediate data storage device.

11. The data processing system of claim 8, wherein the intermediate data storage device is capable of connecting with a plurality of source devices and a plurality of second devices using at least one of wired and wireless networks, wherein the intermediate data storage device detects available devices including at least one of the plurality of source devices and the plurality of second devices, and wherein the intermediate data storage device begins receiving the data from the source device, and sending the stored data to the second device.

12. The data processing system of claim 11, wherein the available devices detect the intermediate data storage device, and wherein the available devices begin at least one of sending the data from the source device and receiving the stored data from the intermediate data storage device.

13. The data processing system of claim 8, wherein the intermediate data storage device is agnostic to data format of the data from the source device;
wherein the intermediate data storage device performs pre-transfer actions comprising responsive to receiving the data and the access parameters from the source device, encrypting the data, by a processing unit executing data sharing instructions stored on the intermediate data storage device; and
wherein the intermediate data storage device performs post-transfer actions comprising responsive to the second device being able to use the stored data, decrypting, at the intermediate data storage device, the data prior to sending the stored data to the second device.

14. A computer program product stored on a non-transitory computer-readable medium, for data transfer using a mobile device, the computer program product comprising:
computer usable code stored on the non-transitory computer readable medium for identifying, by the mobile device, a number of data sharing devices available for connection to the mobile device, wherein each data sharing device that stores particular data on the mobile device specifies particular access parameters for readers of the particular data;
computer usable code stored on the non-transitory computer readable medium for identifying access parameters associated with each of the number of data sharing devices, wherein the mobile device is an intermediate data storage device and wherein the number of data sharing devices include data sharing devices that send data to the mobile device and data sharing devices that receive data from the mobile device; wherein access is controlled by the mobile device to the particular data stored on the mobile device using the particular access parameters, wherein the particular access parameters define which specific data sharing device or category of data sharing devices may read the particular data stored on the mobile device;
computer usable code stored on the non-transitory computer readable medium for determining, by the mobile device, whether devices in the number of data sharing devices are attempting to one of send data to the mobile device and receive data from the mobile device;
computer usable code stored on the non-transitory computer readable medium, for receiving, by the mobile device, responsive to determining that a source device of the number of data sharing devices is attempting to send data to the mobile device, data from the source device and access parameters associated with the data from the source device, wherein the access parameters associated with the data identify a device that can use the data from the source device, wherein the data from the source device is received by the mobile device without user intervention;

computer usable code stored on the non-transitory computer readable medium, for storing, responsive to receiving the data and the access parameters, the data on the mobile device to form stored data and for storing the access parameters associated with the data on the mobile device in association with the stored data to form stored access parameters;

computer usable code stored on the non-transitory computer readable medium, for determining, by the mobile device, responsive to determining that a second device of the number of data sharing devices is attempting to receive the stored data, whether the second device can use the stored data based on the stored access parameters and the access parameters associated with the second device;

computer usable code stored on the non-transitory computer readable medium, for sending, by the mobile device, responsive to determining, by the mobile device, that the second device can use the stored data, the stored data to the second device, wherein sending of the stored data to the second device occurs without user intervention unless the stored access parameters require user intervention; wherein the stored access parameters include criteria for accessing the stored data, time limits within which the stored data must be accessed, requirements for a read confirmation, requirements for only a single read of the stored data, and restrictions on an automatic read and write of the stored data, and a requirement that one or more stored data may not be automatically read without a user intervention.

15. The computer program product of claim 14, wherein the intermediate data storage device performs pre-transfer actions with respect to the data from the source device, and post-transfer actions with respect to the stored data, wherein the intermediate data storage device performing the pre-transfer actions comprises responsive to receiving, by the intermediate data storage device, the data and the access parameters from the source device, computer usable code for encrypting the data stored on the intermediate data storage device;

wherein the intermediate data storage device performing the post-transfer actions comprises responsive to the second device being able to use the stored data, computer usable code for decrypting, at the intermediate data storage device, the data prior to sending the stored data to the second device; and wherein the computer usable code for determining whether the second device can use the stored data comprises computer usable code for receiving access parameters associated with the second device forming device access parameters, and computer usable code for matching the stored access parameters with the device access parameters.

16. The method of claim 6, wherein the intermediate data storage device performing the pre-transfer actions comprises responsive to receiving, by the intermediate data storage device, the data and the access parameters from the source device, encrypting the data, by a processing unit executing data sharing instructions stored on the intermediate data storage device; and wherein the intermediate data storage device performing the post-transfer actions comprises responsive to the second device being able to use the stored data, decrypting, at the intermediate data storage device, the data prior to sending the stored data to the second device.

17. The computer program product of claim 14, further comprising:

computer usable code stored on the non-transitory computer readable medium for connecting, by the intermediate data storage device, with a plurality of source devices and a plurality of second devices using at least one of wired and wireless networks;

wherein the intermediate data storage device is agnostic to data format of the data from the source device.

18. The method of claim 1, wherein identifying, by the mobile device, the number of data sharing devices available for connection and access parameters associated with each of the number of data sharing devices comprises:

identifying, by the mobile device, a number of data sharing devices available for connection via a wireless network prior to establishing a connection with the number of data sharing devices.

19. The data processing system of claim 8, wherein the mobile device is configured to identify the number of data sharing devices available for connection and access parameters associated with each of the number of data sharing devices by identifying a number of data sharing devices available for connection via a wireless network prior to establishing a connection with the number of data sharing devices.

20. The computer program product of claim 14, wherein the computer usable code for identifying, by the mobile device, the number of data sharing devices available for connection and access parameters associated with each of the number of data sharing devices comprises:

computer usable code stored on the non-transitory computer readable medium for identifying, by the mobile device, a number of data sharing devices available for connection via a wireless network prior to establishing a connection with the number of data sharing devices.

* * * * *